United States Patent [19]

Asano et al.

[11] Patent Number: 5,179,861
[45] Date of Patent: Jan. 19, 1993

[54] DIAPHRAGM TYPE PRESSURE SENSOR

[75] Inventors: Nobuhiro Asano, Yokosuka; Hiroshi Kobayashi, Yokohama, both of Japan

[73] Assignee: Nissan Motor Co., Ltd., Yokohama, Japan

[21] Appl. No.: 639,268

[22] Filed: Jan. 10, 1991

[30] Foreign Application Priority Data

Jan. 17, 1990 [JP] Japan .................................. 2-6304

[51] Int. Cl.⁵ ............................ G01L 7/08; G01L 9/04
[52] U.S. Cl. .......................................... 73/726; 73/727; 73/756; 338/4
[58] Field of Search .................. 73/726, 727, 724, 756; 338/4

[56] References Cited

U.S. PATENT DOCUMENTS

| | | | |
|---|---|---|---|
| 2,840,675 | 6/1958 | Giovanni | 338/4 |
| 3,520,191 | 7/1970 | Pien | 73/726 |
| 3,537,318 | 11/1970 | Helin | 338/4 |
| 4,085,620 | 4/1978 | Tanaka | 73/727 |
| 4,102,210 | 7/1978 | Couston | 338/4 |
| 4,127,840 | 11/1978 | House | 338/4 |
| 4,884,451 | 12/1989 | Schulze | 338/4 |
| 4,934,193 | 6/1990 | Hayata | 338/4 |

FOREIGN PATENT DOCUMENTS 158834 10/1986 Japan .

Primary Examiner—Donald O. Woodiel
Attorney, Agent, or Firm—Leydig Voit & Mayer

[57] ABSTRACT

A diaphragm type pressure sensor comprises a transducer main body and a protective cover. The main body has a diaphragm portion, a support portion supporting the periphery of the diaphragm portion, and a trunk portion having a shoulder surface which surrounds the support portion and which forms a step surrounding the support portion. The support portion projects upwardly from the inner periphery of the shoulder surface, and is separated by the shoulder surface from the protective cover fitted over the trunk portion. Therefore, the diaphragm portion is not easily influenced by an external force applied to the trunk portion from the protective cover. The main body may further has an abutting surface which forms another step surrounding the support portion, and which abuts against a lower end of the protective cover.

24 Claims, 3 Drawing Sheets

DIAPHRAGM TYPE PRESSURE SENSOR

BACKGROUND OF THE INVENTION

The present invention relates to pressure sensors or pressure transducers for measurement of fluid pressure, and more specifically to diaphragm type pressure sensors or pressure transducers using a diaphragm sensing element.

One conventional pressure sensor is shown in FIG. 5. In FIG. 5, a pressure sensor 3 is fitted in a mounting hole 2 of a fluid container 1 which can contain a measured fluid. The pressure transducer 3 includes a support member 4, a diaphragm 5 and strain gages 7 attached to an outer side of the diaphragm 5. The support member 4 is formed with a pressure introducing hole 6 for introducing a measured pressure to an inner side of the diaphragm 5. The pressure transducer 3 further includes a cover 8 protecting the strain gages 7. In this transducer, however, an external force is easily applied to the diaphragm 5 especially during an operation for forcibly fitting and tightening the cover 8 over the support member 4. Therefore, the diaphragm 5 is susceptible to undesired deformation disturbing the pressure measurement.

SUMMARY OF THE INVENTION

It is an object of the present invention to provide a diaphragm type pressure sensor (or transducer) which is resistant to external forces.

According to the present invention, a presssure sensor comprises a main body which comprises a diaphragm portion, a portion defining a pressure instruducing hole for introducing a measured pressure to an inner side of the diaphragm portion, a support portion supporting the diaphragm portion, and a trunk portion forming a step surrounding the support portion. Therefore, the support portion is isolated by the step from the surrounding periphery. In a preferred embodiment, the trunk portion of the main body has a shoulder surface and an abutting surface each of which surrounds the support portion and forms a step. Each of the shoulder and abutting surfaces is bounded between an inner boundary (line) which is closed like a circle or a polygon, and an outer boundary (line) which is also closed. Each of the shoulder and abutting surfaces extends radially outwardly from the inner boundary to the outer boundary. The support portion projects from the inner boundary of the shoulder surface.

DETAILED DESCRIPTION OF THE INVENTION

Figure 1:
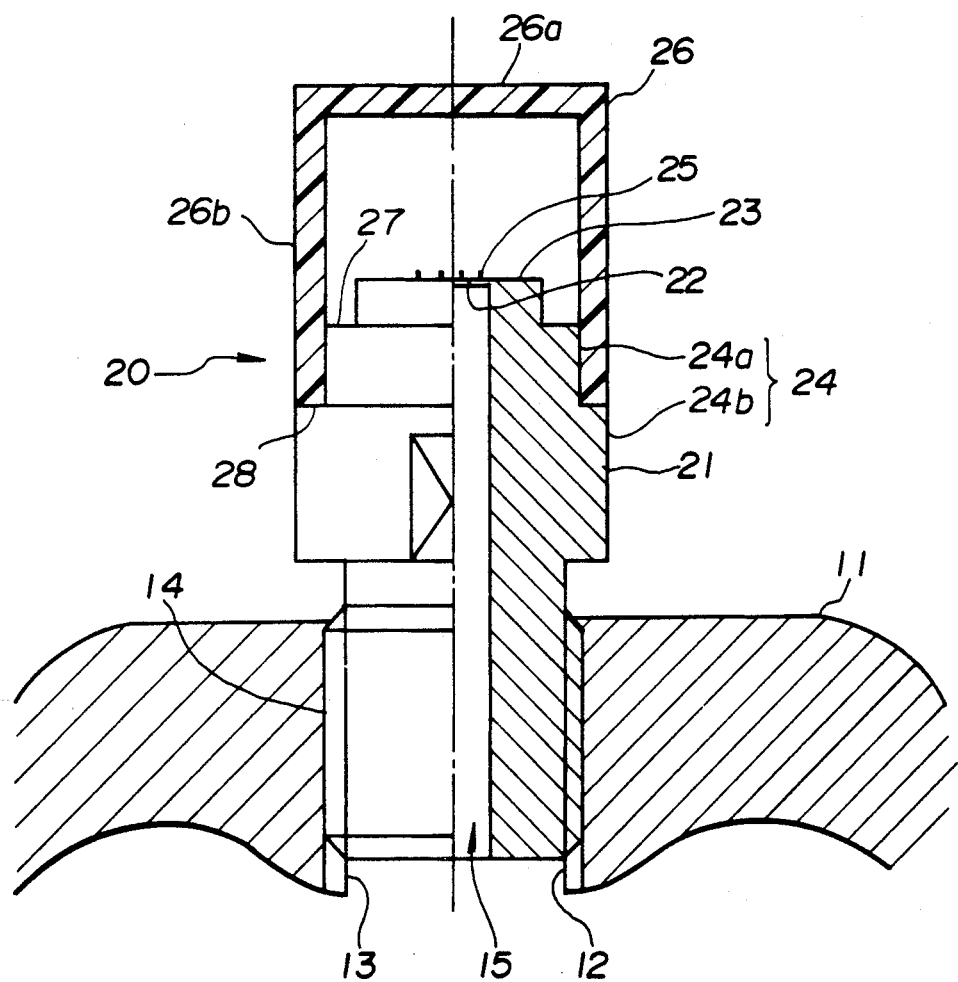
FIG. 1 is a side view showing, partly in section, a pressure sensor according to one embodiment of the present invention.
Figure 2:
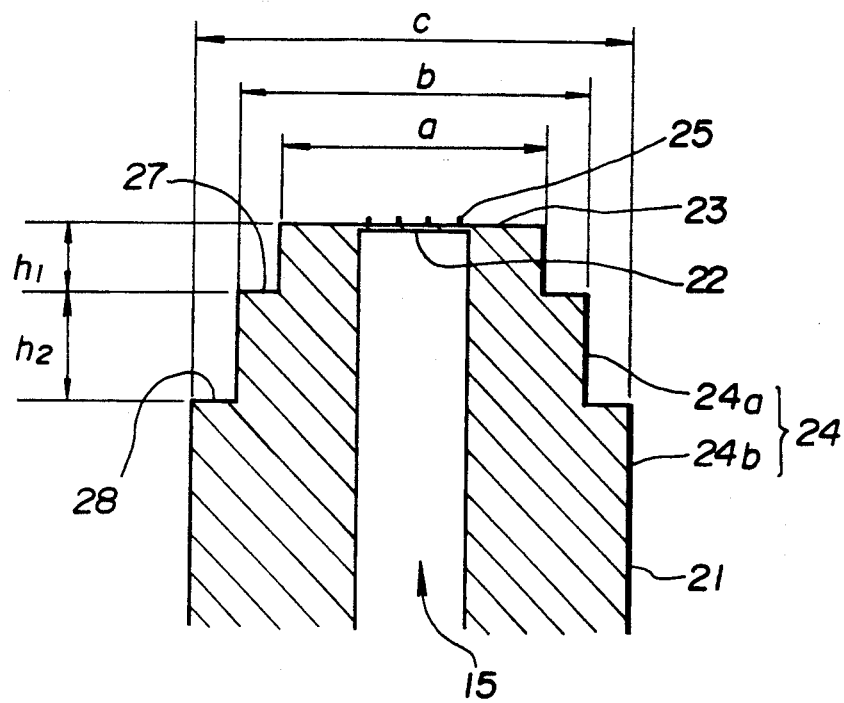
FIG. 2 is a sectional view showing a diaphragm support portion of the pressure sensor shown in FIG. 1.

FIGS. 1 and 2 show a pressure sensor according to the present invention.

A container 11 for containing a measured fluid is formed with a mounting hole 12. An internal thread 13 is formed on the inside surface of the hole 12. A pressure transducer 20 is fixed to the container 11 by the use of the thread 13 of the container 11, and a threaded mounting portion 14 of the transducer 20.

The pressure transducer 20 includes a transducer main body 21 and a protecting cover (or case) 26. The transducer main body 21 includes a diaphragm portion 22, a diaphragm support portion 23, a trunk portion 24, and the above-mentioned mounting portion 14. The mounting portion 14 is received in the internally threaded hole 12 of the container 11. The transducer 20 is fastened to, and supported by, the container 11 only at the mounting portion 14. In this embodiment, the main body 21 is a single piece of stainless steel (or stainless alloy). The diaphragm portion 22, the support portion 23, the trunk portion 24, and the mounting portion 14 are all integral parts of the main body 21.

The main body 21 includes a portion defining a pressure introducing hole 15 for introducing a meassured pressure from the interior cavity of the container 11 to an inner side of the diaphragm portion 22. The pressure introducing hole 15 of this embodiment is straight and circular. A transducing element is affixed to an outer side of the diaphragm portion 22. In this embodiment, one or more strain gages 25 are attached to the outer side of the diaphragm portion 22, and designed to sense a displacement of the diaphragram portion 22 caused by a difference between pressures on both sides of the diaphragm portion 22. The strain gages 25 are connected with an amplifying circuit (not shown).

The diaphragm portion 22 is supported around its periphery by a top end of the support portion 23. The diaphragm portion 22 of this embodiment is a thin circular flat plate. However, the diaphragm portion 22 may have concentric corrugations. The support portion 23 of this embodiment is cylindrical. The support portion 23 has a flat top surface, and a cylindrical outside surface which is a curved surface of a right circular cylinder. The axis of the cylindrical support portion 23 is coincident with a center line of the main body 21. The axis of the pressure introducing circular hole 15 is also coincident with the center line. Therefore, the cylindrical support portion 23 is coaxial with the circular hole 15. The center line passes through a center of the diaphragm portion, and is perpendicular to the diaphragm portion 22. It is optional to shape either or both of the diaphragm portion 22 and the support portion 23 like a radially symmetrical figure such as a figure having a sectional shape of a regular polygon. The support portion 23 projects upwardly, as viewed in FIG. 1, from a top end of the trunk portion 24. In this embodiment, the flat top surface of the support portion 23 is flush with the upper outer surface of the diaphragm portion 22, so that both surface form a single flat plane.

The trunk portion 24 of this embodiment includes a first portion 24a and a second portion 24b. In this embodiment, the first portion 24a is also cylindrical, and has a cylindrical outside surface which is a curved surface of a right circular cylinder. The cylindrical first portion 24a is coaxial with the support portion 23, and greater in diameter than the support portion 23. The first portion 24a further has a shoulder surface 27 surrounding the support portion 23. The shoulder surface 27 is bounded between an inner boundary line which is closed, and an outer boundary line which is also closed. The shoulder surface 27 extends radially outwardly from the inner boundary line to the outer boundary line. The support portion 23 projects upwardly as viewed in FIG. 1 from the inner boundary line of the shoulder surface 27. In this embodiment, the support portion 23 and the first portion 24a are both cylindrical. Therefore, the inner and outer boundary lines are concentric circles. The outer boundary circle is greater in diameter than the inner boundary circle. The shoulder surface 27 of this embodiment is substantially flat, and substantially perpendicular to the center line of the transducer body 21 which is a common axis of the support and first portions 23 and 24a. The shoulder surface 27 faces upwardly as viewed in FIG. 1. The inner boundary line of the shoulder surface 27 is an intersection between the shoulder surface 27 and the cylindrical surface of the support portion 23. The outer boundary line of the shoulder surface 27 is an intersection between the shoulder surface 27 and the cylindrical surface of the first portion 24a.

The trunk portion 24 of this embodiment further includes the second portion 24b. The second portion 24b is generally cylindrical, and has a cylindrical outside surface of a right circular cylinder. The second portion 24b is coaxial with the first portion 24a, and greater in diameter than the first portion 24a. The cylindrical support portion 23 is formed on the cylindrical first portion 24a, and the first portion 24a is formed on the cylindrical second portion 24b. The diameter of the support portion is smaller than the diameter of the first portion 24a, and the diameter of the first portion 24a is smaller than the diameter of the second portion 24b. The second portion 24b further has an abutting surface 28 which surrounds the cylindrical surface of the first portion 24a, and extends radially outwardly from the cylindrical surface of the first portion 24a. The abutting surface 28 of this embodiment is substantially flat and substantially perpendicular to the center line. Like the shoulder surface 27, the abutting surface 28 is annular and bounded between two concentric boundary circles. The cylindrical outside surface of the second portion 24b extends downwardly, as viewed in FIG. 1, from the outer boundary circle of the abutting surface 28. The second portion 24b is adapted to be gripped by a tool. The second portion 24b may have portions for facilitating engagement with the tool for fastening the transducer body 21 to the container 11.

The protective cover 26 of this embodiment has a flat top portion 26a, and a cylindrical portion 26b extending from the periphery of the top portion. The cylindrical portion 26b of the cover 26 has a flat annular end surface. The cover 26 is fitted over the first portion 24a of the transducer main body 21. The top portion 26a of the cover 26 has a flat inside surface facing toward the diaphragm portion 22. The flat inside surface of the cover top portion 26a is sufficiently spaced from the diaphragm portion 22. The cylindrical portion 26b of the cover 26 has a cylindrical inside surface facing radially inwardly toward the center line of the transducer body 21. This cylindrical inside surface of the cylindrical portion 26b abuts on the outwardly facing cylindrical outside surface of the first portion 24a of the transducer body 21. The annular end surface of the cover 26 abuts on the annular abutting surface 28 of the transducer body 21. The cylindrical inside surface of the cover 26 faces toward the cylindrical outside surface of the support portion 23. However, the cylindrical inside surface of the cover 26 is separated from the cylindrical outside surface of the support portion 23 by the shoulder surface 27. An annular space is interposed between the support portion 23 and the cylindrical inside surface of the cover 26. In this embodiment, the support portion 23 is radially spaced from the cylindrical outside surface of the second portion 24b by both of the shoulder surface 27 and the abutting surface 28. The main body 21 of this embodiment has a first annular step formed by the shoulder surface 27, and a second annular step formed by the abutting surface 28.

The mounting portion 14 projects downwardly, as viewed in FIG. 1, from the second portion 24b. The mounting portion 14 is smaller in diameter than the second portion 24b. The transducer 20 of this embodiment is supported only at the mounting portion 14. The trunk portion 24, the support portion 23 and the cover 26 are spaced from the container 11.

In this embodiment, the outside diameter "c" of the second portion 24b is 20 mm, the outside diameter "b" of the first portion 24a is 16 mm, and the outside diameter "a" of the support portion 23 is 12 mm. The height $h_1$ of the support portion 23 is 3 mm, and the height $h_2$ of the first portion 24a is 5 mm. In this embodiment, the height $h_1$ (i.e. axial length) of the support portion 23 is smaller than the height $h_2$ of the first portion 24a.

In this pressure transducer 20, the diaphragm support portion 23 is surrounded by the shoulder surface 27 and the abutting surface 28. Therefore, the diaphragm portion 22 is not influenced even when a force is applied to the first or second portion 24a or 24b of the trunk portion 24.

Figure 3:
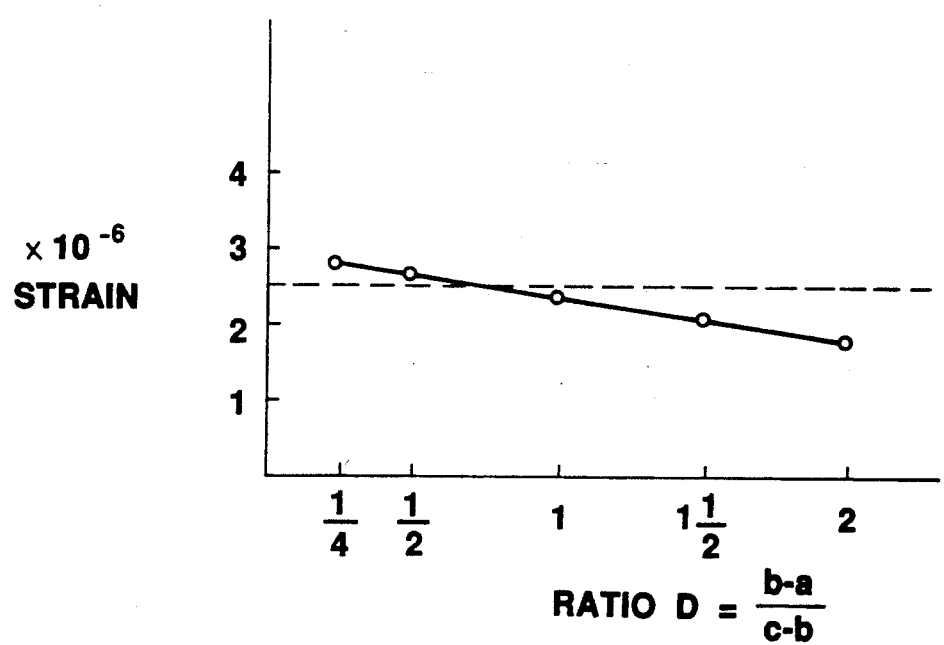
FIG. 3 is a graph showing a relationship between a dimensional ratio of the diaphragm support portion of the invention and a strain.

In general, it is necessary to limit a strain output due to disturbance within 3% of a rated output of a pressure sensor. When the rated output of the sensor is $1400 \times 10^{-6}$ strain, then the disturbance output must be within $42 \times 10^{-6}$ strain. Two main factors of the disturbance output are a temperature drift at zero point of a strain sensing metal resistive element used for pressure measurement, and a factor due to external forces applied to the transducer body. The zero point temperature drift, at 25°-80° C., of the currently used strain sensing metal resistive element is $30 \times 10^{-6}$ strain. Therefore, the strain output due to undesired external forces must be limited within $10 \times 10^{-6}$ strain in order to limit the strain output due to disturbance within 3% of the sensor rated output. In the pressure sensor, the strain sensing metal resistive elements are arranged in a bridge. Therefore, the strain in a single gage must be within $2.5 \times 10^{-6}$ strain. Consequently, it is necessary to design the pressure sensor so that the strain produced in the diaphragm is within $2.5 \times 10^{-6}$ strain. FIG. 3 shows a relationship, experimentally confirmed, between a measured strain in the diaphragm portion 22 and a ratio D which is equal to $(b-a)/(c-b)$. In this example, five different transducer bodies were prepared. Their values of the ratio D are $\frac{1}{4}$, $\frac{1}{2}$, 1, 3/2 and 2. The ordinate of the graph shown in FIG. 3 expresses the strain of the diaphragm portion measured when a load of 5 Kg is applied to the first portion 24 of each transducer body. This load corresponds to an external force applied when the cover is forcibly fitted over the first portion 24a. As is evident from the graph of FIG. 3, it is possible to limit the strain of the diaphragm portion 22 below $2.5 \times 10^{-6}$ strain by setting the outside diameter "b" of the first portion 24a to such a value as to make the ratio D equal to or greater than 1. Therefore, it is desirable to design the transducer body 21 so that the difference between the outside diameters of the first portion 24a and the support portion 23 is equal to or greater than the difference between the outside diameters of the first and second portions 24a and 24b.

Figure 4A:
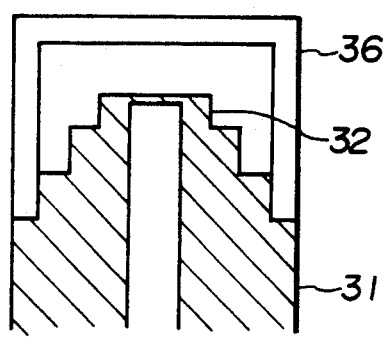
FIGS. 4A and 4B are sectional views showing variations of the embodiment.
Figure 4B:
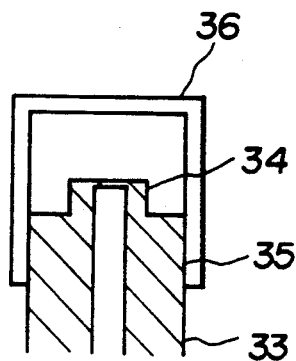
Figure 5:
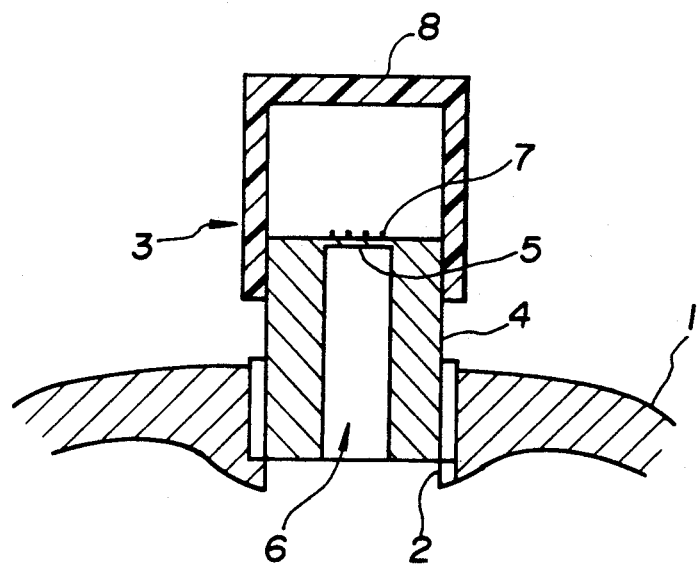
FIG. 5 is a sectional view showing a conventional pressure sensor.

FIGS. 4A and 4B shows variations of the embodiment of the invention. A transducer main body 31 shown in FIG. 4A has two shoulder surfaces and one abutting surface, and its support portion 32 is surrounded by three annular steps. The support portion 32 is separated from a cover 36 by the two shoulder surfaces. A transducer main body 33 shown in FIG. 4B has only one shoulder surfce and has no abutting surface, and its support portion 34 is separated from the cover 36 by the shoulder surface.

In the transducer main body according to the invention, the diaphragm portion 22, the pressure introducing hole 15, and the diaphragm support portion 23 are all formed within a first imaginary cylindrical surface of a first right circular cylinder even if the support portion 23 is not cylindrical. The outside surface of the first portion 24a lies outside a second immaginary right circular cylinder which is coaxial with the first imaginary cylinder and which is greater in diameter than the first imaginary cylinder. The common axis of the first and second imaginary cylinders is coincident with the center line of the main body 21. The inner boundary of the shoulder surface 27 lies on or inside the cylindrical surface of the first imaginary cylinder, and the outer boundary of the shoulder surface 27 lies on or outside the cylindrical surface of the second imaginary cylinder. At any rate, the shoulder surface 27 extends radially outwardly from the cylindrical surface of the first imaginary cylinder to the cylindrical surface of the second imaginary cylinder, and forms an annular space which is bounded between the cylindrical surfaces of the first and second imaginary cylinders and which surrounds the support portion. In the embodiment shown in FIG. 1, the first imaginary cylinder may be formed by extending the cylindrical outside surface of the support portion 23 upwardly and downwardly, and the second imaginary cylinder may be fored by extending the cylindrical outside surface of the first portion 24a upwardly and downwardly.

What is claimed is:

1. A pressure sensor comprising:
   a jointless transducer main body comprising a trunk having a first annular step and a second annular step surrounding said first annular step, a diaphragm support disposed on and surrounded by said first annular step, a plate-shaped diaphragm having a periphery supported by said diaphragm support and having an inner side and an outer side, and a hole having a constant cross-sectional shape in said diaphragm support and said trunk and communicating with said inner side of said diaphragm for introducing a fluid to said inner side of said diaphragm; and
   a transducing element mounted on said outer side of said diaphragm for sensing deflection of said diaphragm.

2. A pressure sensor according to claim 1 wherein said trunk comprises a shoulder surface which is bounded between an inner boundary which is closed and an outer boundary which is also closed, said shoulder surface surrounding said diaphragm support and extending radially outwardly from said inner boundary to said outer boundary, said diaphragm support projecting from said inner boundary of said shoulder surface.

3. A pressure sensor according to claim 2 further comprising a cover attached to said body for enclosing and protecting said diaphragm and said transducing element, said trunk comprising a first portion over which said cover is fitted, an outside surface of said first portion surrounding said outer boundary of said shoulder surface.

4. A pressure sensor according to claim 3 wherein said cover comprises an inside surface surrounding and facing toward said diaphragm support and said first portion, said inside surface of said cover abutting on said outside surface of said first portion, said diaphragm support being spaced from said inside surface of said cover, said diaphragm support having a top end supporting the periphery of said diaphragm, said diaphragm support projecting from said shoulder surface to said top end, said transducing element being affixed to said outer side of said diaphragm.

5. A pressure sensor according to claim 3 wherein said diaphragm, said hole, and said diaphragm support are all disposed within a first imaginary cylindrical surface defined by a first imaginary right circular cylinder, said outer boundary of said shoulder surface surrounding said first imaginary cylinder, said shoulder surface extending radially outwardly from said first imaginary cylindrical surface to a second imaginary cylindrical surface defined by a second imaginary right circular cylinder which is coaxial with said first cylinder and which is larger in diameter than said first cylinder, said outside surface of said first portion lying outside said second cylinder.

6. A pressure sensor according to claim 5 wherein said trunk comprises an abutting surface which surrounds said first portion and which extends radially outwardly from said first portion, said cover having an end abutting on said abutting surface.

7. A pressure sensor according to claim 6 wherein said hole extends along a common axis of said first and second imaginary cylinders and passes through said trunk and said diaphragm support.

8. A pressure sensor according to claim 7 wherein said shoulder surface is substantially flat and substantially perpendicular to said common axis.

9. A pressure sensor according to claim 8 wherein said abutting surface is substantially flat and substantially perpendicular to said common axis.

10. A pressure sensor according to claim 7 wherein said diaphragm is a thin, radially symmetric plate, the common axis of said first and second imaginary cylinders passes through a center of said diaphragm and is perpendicular to said diaphragm, and said diaphragm support is radially symmetric.

11. A pressure sensor according to claim 7 wherein said diaphragm is a circular plate, and said diaphragm support is shaped like a right circular cylinder, said diaphragm support being coaxial with the first and second imaginary cylinders, the common axis of which passes through a center of said diaphragm and is perpendicular to said diaphragm.

12. A pressure sensor according to claim 11 wherein said body further comprises a mounting portion projecting from said trunk, said trunk being disposed between said diaphragm support and said mounting portion.

13. A pressure sensor according to claim 12 wherein said body is a single piece of a stainless alloy.

14. A pressure sensor according to claim 13 wherein said trunk comprises a second portion disposed between said first portion and said mounting portion and has a larger sectional area than said first portion.

15. A pressure sensor according to claim 14 wherein each of said first and second portions is a right circular cylinder and is coaxial with said diaphragm support, a diameter of said diaphragm support being smaller than a diameter of said first portion, and a diameter of said second portion being greater than that of said first portion.

16. A pressure sensor according to claim 15 wherein the difference between the diameter of said diaphragm support and the diameter of said first portion is equal to or greater than the difference between the diameter of said first portion and the diameter of said second portion.

17. A pressure sensor according to claim 16 wherein said mounting portion comprises an externally threaded portion, and said mounting portion is smaller in sectional size than said second portion.

18. A pressure sensor according to claim 17 further comprising a container for containing a pressurized fluid, wherein said body is secured to said container and supported by said container only at said mounting portion.

19. A pressure sensor according to claim 1 wherein said transducer main body further comprises a mounting portion for mounting to a pressure container, said mounting portion projecting from a lower end of said trunk and said diaphragm support projecting from an opposite upper end of said trunk.

20. A pressure sensor according to claim 1 wherein said diaphragm support comprises a top surface bounded by a first circular boundary supporting the periphery of said diaphragm and an outside cylindrical surface extending straight from said first circular boundary to a second circular boundary on said trunk, and said trunk comprises an annular flat shoulder surface extending radially outwardly from said second circular boundary to a third circular boundary.

21. A pressure sensor according to claim 20 further comprising a cover attached to said body enclosing and protecting said diaphragm and said transducing element, wherein said trunk comprises a first cylindrical surface over which said cover is fitted and an annular flat abutting surface surrounding said first cylindrical surface and extending radially outwards from a fourth circular boundary which is a boundary between said first cylindrical surface and said abutting surface to a fifth circular boundary, said cover comprising an end abutting on said abutting surface.

22. A pressure sensor comprising:
a plate-shaped diaphragm having a periphery, an inner side, and an outer side;
a transducing element mounted on said outer side of said diaphragm for sensing deflection of said diaphragm;
a diaphragm support having a diameter and comprising a top end supporting the periphery of said diaphragm, a bottom end, and a cylindrical outside surface extending from said top end to said bottom end; and
a trunk comprising a first cylindrical portion having a diameter and forming a first annular step and a second cylindrical portion having a diameter and forming a second annular step surrounding said first annular step, said first cylindrical portion having a diameter larger than the diameter of said diaphragm support and smaller than the diameter of said second cylindrical portion, said diaphragm support and said first and second cylindrical portions being coaxial, said first cylindrical portion extending from said bottom end of said diaphragm support to said second cylindrical, the difference between the diameter of said diaphragm support and the diameter of said first cylindrical portion being at least equal to the difference between the diameter of said first cylindrical portion and the diameter of said second cylindrical portion, said diaphragm support being disposed on said first annular step, said trunk and said diaphragm support comprising a jointless transducer main body.

23. A pressure sensor comprising:
a transducer main body comprising a plate-shaped diaphragm having an inner side and an outer side, a mounting portion for mounting to a container for a fluid, a cylindrical diaphragm support having a top end supporting a periphery of said diaphragm, a trunk extending between said mounting portion and said diaphragm support and comprising a first cylindrical portion and a second cylindrical portion, the first cylindrical portion being disposed between said diaphragm support and said second cylindrical portion and having a smaller diameter than said second cylindrical portion and a larger diameter than said diaphragm support, and a hole of constant cross-section in said diaphragm support and said trunk and communicating with said inner side of said diaphragm for introducing a fluid from said container to said inner side of said diaphragm;
a transducing element for sensing deflection of said diaphragm affixed to the outer side of said diaphragm; and
a cover for protecting said transducing element, said cover being fitted over said first cylindrical portion, wherein the difference between the diameter of said first cylindrical portion and the diameter of said diaphragm support is at least equal to the difference between the diameter of said second cylindrical portion and the diameter of said first cylindrical portion.

24. A pressure transducer comprising:
a trunk comprising a first cylindrical portion having a top end and a bottom end and a constant diameter, a second cylindrical portion coaxial with the first cylindrical portion and having a constant diameter larger than the diameter of the first cylindrical portion and having a top end and a bottom end, the bottom end of the first cylindrical portion being integral with the top end of the second cylindrical portion;
a cylindrical diaphragm support coaxial with the first cylindrical portion and having a constant diameter smaller than the diameter of the first cylindrical portion and having a top end and a bottom end integral with the top end of the first cylindrical support, the difference between the diameter of the diaphragm support and the diameter of the first cylindrical portion of the trunk being greater than or equal to the difference between the diameters of the first and second cylindrical portions of the trunk;
a plate-shaped diaphragm having an inner surface, an outer surface, and a periphery surrounded by the diaphragm support, the diaphragm being integral with the top end of the diaphragm support, wherein the trunk, the diaphragm support, and the diaphragm comprise a jointless body;

a transducing element mounted on the outer surface of the diaphragm;

a mounting portion secured to the trunk for mounting the trunk on a container for a fluid;

a passage for fluid between an external surface of the mounting portion and the inner surface of the diaphragm; and a cover having an end surrounding the first cylindrical portion and abutting against the top end of the second cylindrical portion of the trunk.

* * * * *

UNITED STATES PATENT AND TRADEMARK OFFICE
CERTIFICATE OF CORRECTION

PATENT NO. : 5,179,861

DATED : January 19, 1993

INVENTOR(S) : Asano et al.

It is certified that error appears in the above-identified patent and that said Letters Patent is hereby corrected as shown below:

Claim 22, col. 8, line 7, after "cylindrical" insert --portion--.

Signed and Sealed this

Twenty-sixth Day of October, 1993

*Attest:*

BRUCE LEHMAN

*Attesting Officer*        *Commissioner of Patents and Trademarks*